United States Patent
Gellert

[11] Patent Number: 5,318,434
[45] Date of Patent: Jun. 7, 1994

[54] INJECTION MOLDING TORPEDO PROVIDING A FIXED RING GATE

[76] Inventor: Jobst U. Gellert, 7A Prince St., Georgetown, Ontario, Canada L7G 2X1

[21] Appl. No.: 47,928
[22] Filed: Apr. 19, 1993
[51] Int. Cl.⁵ .............................. B29C 45/20
[52] U.S. Cl. ................... 425/549; 264/328.15
[58] Field of Search ............ 425/549; 264/328.15

[56] References Cited
U.S. PATENT DOCUMENTS

| | | |
|---|---|---|
| 4,279,588 | 7/1981 | Gellert .................. 425/549 |
| 4,450,999 | 5/1984 | Gellert .................. 425/549 |
| 4,521,779 | 6/1985 | Gellert .................. 425/549 |
| 4,771,164 | 9/1988 | Gellert .................. 425/549 |

Primary Examiner—Tim Heitbrink
Attorney, Agent, or Firm—Dalesman & Company

[57] ABSTRACT

Injection molding apparatus wherein a torpedo is mounted at the front end of a nozzle to provide a fixed ring gate. The torpedo has an elongated central shaft with a nose portion which projects forwardly into a cylindrical opening extending through the mold to the cavity. The outer surface of the nose portion is sufficiently spaced from the inner surface of the opening to form the ring gate through which the melt flows into the cavity. The nose portion of the central shaft enhances heat transfer during the injection cycle and thus reduces cycle time and provides cleaner gates.

6 Claims, 2 Drawing Sheets

INJECTION MOLDING TORPEDO PROVIDING A FIXED RING GATE

BACKGROUND OF THE INVENTION

This invention relates generally to injection molding and more particularly to a torpedo which is mounted at the front end of a nozzle to provide a fixed ring gate.

The use of injection molding torpedoes having an elongated central shaft with a pointed tip to provide a hot tip gate is well known. An early example is shown in the applicants' U.S. Pat. No. 4,450,999 which issued May 29, 1984. This has the disadvantage that the improvement in thermal conductivity in the gate area is limited by the shape of the hot tip.

It is also known to provide a core ring gate around a valve member which extends through the cavity as well as the gate and is reciprocated between the open and closed positions. An example is seen in the applicants' U.S. Pat. No. 4,521,179 which issued Jun. 4, 1985. In addition to requiring actuating mechanism, this configuration has the disadvantage that it is only suitable for molding products with a core hole through them.

SUMMARY OF THE INVENTION

Accordingly, it is an object of the present invention to at least partially overcome the disadvantages of the prior act by providing injection molding apparatus having a torpedo with a nose portion which extends into an opening through the mold to provide a fixed ring gate therebetween.

To this end, in one of its aspects, the invention provides injection molding apparatus comprising a heated nozzle seated in a well in a mold and a torpedo to convey melt to an opening with an inner surface extending through the mold from the well to a cavity having a rear face, the nozzle having a rear end, a front end, a melt bore extending longitudinally therethrough from the rear end to the front end, and a seat extending around the melt bore at the front end of the nozzle, the torpedo having an outer collar, an elongated shaft extending centrally through the outer collar with an opening extending through the torpedo between the central shaft and the outer collar, and at least one support member extending across the opening between the central shaft and the outer collar, the outer collar being removably received in the seat at the front end of the nozzle with the opening through the torpedo aligned with the melt bore through the nozzle and the central shaft of the torpedo aligned with the opening through the mold to the cavity, having the improvement wherein the central shaft of the torpedo has a forwardly projecting nose portion with an outer surface extending centrally into the opening through the mold, the outer surface of the nose portion being sufficiently spaced from the inner surface of the opening through the mold to form a fixed ring gate through which the melt flows into the cavity.

Further objects and advantages of the invention will appear from the following description taken together with the accompanying drawings.

DETAILED DESCRIPTION OF THE INVENTION

Figure 1:
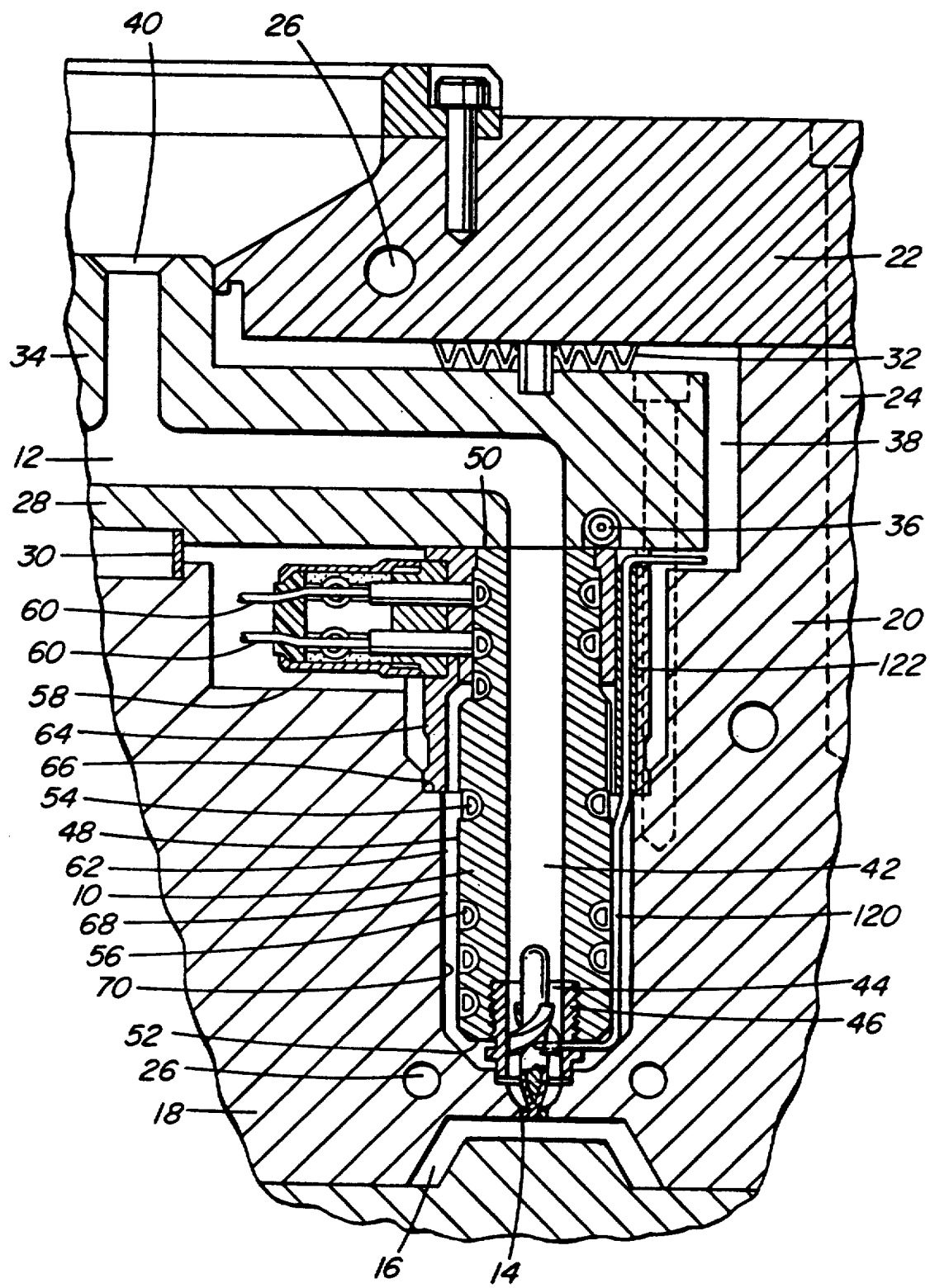
FIG. 1 is a sectional view of a portion of a multi-cavity injection molding system showing apparatus according to one embodiment of the invention.

Reference is first made to FIG. 1 which shows a portion of a multi-cavity injection molding system having several steel nozzles 10 to convey pressurized plastic melt through a melt passage 12 to respective fixed ring gates 14 leading to different cavities 16 in the mold 18. In this particular configuration, the mold includes a cavity plate 20 and a back plate 22 which are removably secured together by bolts 24. Other molds may include a variety of other plates or parts, depending upon the application. The mold 18 is cooled by pumping cooling water through cooling conduits 26 extending in the cavity plate 20 and the back plate 22. An electrically heated steel melt distribution manifold 28 is mounted between the cavity plate 20 and back plate 22 by a central locating ring 30 and insulative and resilient spacer members 32. The melt distribution manifold 28 has a cylindrical inlet portion 34 and is heated by an integral electrical heating element 36. An insulative air space 38 is provided between the heated manifold 28 and the surrounding cooled cavity plate 20 and back plate 22. The melt passage 12 extends from a central inlet 40 in the inlet portion 34 of the manifold 28 and branches outward in the manifold 28 to each nozzle 10 where it extends through a central melt bore 42 and then through an aligned opening 44 through a torpedo 46 to one of the fixed ring gates 14 according to the invention, described in more detail below.

Each nozzle 10 has an outer surface 48, a rear end 50, and a front end 52. The nozzle 10 is heated by an integral electrical heating element 54 which has a spiral portion 56 extending around the melt bore 42 and an external terminal 58 to which electrical leads 60 from a power source are connected. The nozzle 10 is seated in a well 62 in the cavity plate 20 with a cylindrical locating flange 64 extending forwardly to a circular locating shoulder 66 in the well 62. Thus, an insulative air space 68 is provided between the inner surface 70 of the well 62 and the outer surface 48 of the nozzle 10 to provide thermal separation between the heated nozzle 10 and the surrounding cooled mold 18.

Figure 2:
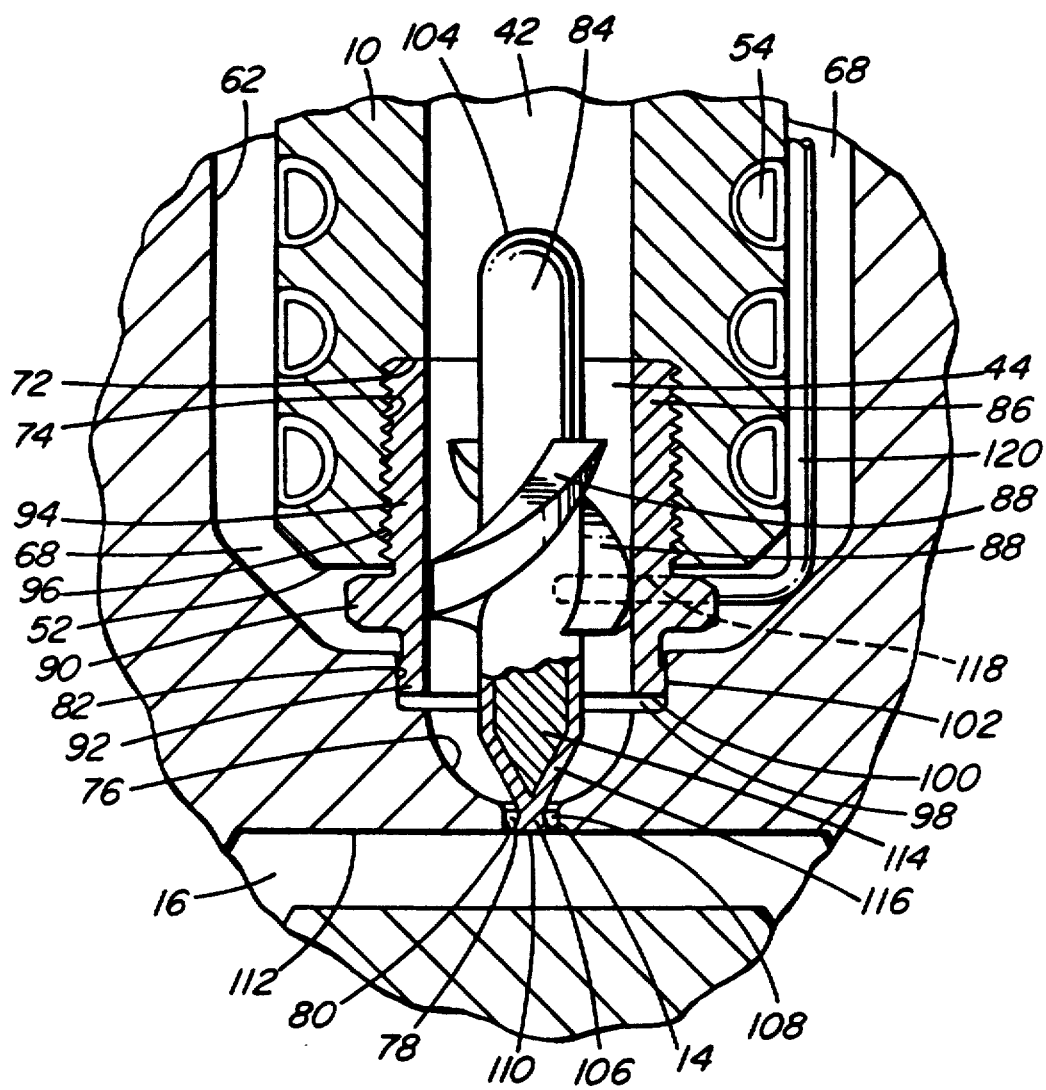
FIG. 2 is an enlarged portion of FIG. 1 showing a torpedo mounted between a nozzle and a mold to form a fixed ring gate leading to the cavity.

As best seen in FIG. 2, the nozzle 10 has a seat 72 with a threaded inner surface 74 extending around the melt bore 42 at its front end 52. The well 62 in the mold 18 has a smaller central portion 76 which extends forwardly past the insulative air space 68 and inwardly to an opening 78 which extends through the mold 18 from the well 62 to the cavity 16. In this embodiment, the opening 78 has a cylindrical inner surface 80, but in other embodiments the inner surface 80 can be tapered or have other suitable shapes. A circular seat 82 extends around the central portion 76 of the well 62 in the mold 18.

The torpedo 46 has an elongated central shaft 84 extending longitudinally through an outer collar 86 with the opening 44 therebetween. In this embodiment, the central shaft 84 is connected to the outer collar 86 by a pair of spiral blades 88 extending across the opening 44, but in other embodiments one or more other support members such as pins or straight fins can be used instead. The outer collar 86 of the torpedo 46 has a nut-like intermediate portion 90 extending between a cylindrical front portion 92 and a cylindrical rear portion 94 with a threaded outer surface 96. The rear portion 94 is screwed into the seat 72 extending around the melt bore 42 at the front end 52 of the nozzle 10, and the nozzle 10 is received in the well 62 with the front portion 92 of the outer collar 86 seated in the seat 82 in the mold 16. Screwing the torpedo 46 into the nozzle 10 has the advantage that it is secured in place with a small space 98 provided adjacent the forward end 100 of the outer collar 86 to avoid damage to the mold 18. Also, it is easily removed by applying a wrench to the hexagonal intermediate portion 90 of the outer collar 86. Thus, the outer collar 86 of the torpedo 46 bridges the insulative air space 68 extending between the front end 52 of the nozzle 10 and the mold 18 and prevents pressurized melt escaping into the air space 68. A seal is provided between the outer surface 102 of the front portion 92 of the outer collar 86 and the surrounding seat 82.

The elongated central shaft 84 of the torpedo 46 has a smoothly rounded rear end 104 which extends rearwardly past the outer collar 86, and a forwardly projecting nose portion 106 which extends centrally into the opening 78 through the mold 18. The nose portion 106 of the central shaft 84 has an outer surface 108 which is spaced sufficiently from the surrounding inner surface 80 of the opening 78 to form the fixed ring gate 14 through which the melt flows into the cavity 16. The nose portion 106 of the elongated central shaft 84 has a flat front face 110 which, in this embodiment, is aligned with the rear face 112 of the cavity 16. As can be seen, the elongated central shaft 84 of the torpedo 46 tapers inwardly to the nose portion 106 and, in this embodiment, the outer surface 108 of the nose portion 106 flares outwardly towards the front face 110. The elongated central shaft 84 has an inner portion 114 surrounded by a thin outer portion 116. The inner portion 114 is made of a highly thermally conductive material such as silver or copper, and the outer portion 116 is made of an abrasion and corrosion resistant material such as high speed steel to withstand wear from the pressurized melt flowing around it, particularly in the area of the gate 14.

A thermocouple bore 118 extends radially inward into the torpedo 46 through the outer collar 86 and one of the spiral blades 88 to the inner portion 114 of the central shaft 84. A thermocouple element 120 is received in the thermocouple bore 118 to accurately monitor the operating temperature. The thermocouple element 120 extends rearwardly through the air space 68 and out through a hollow thermocouple tube 122. Thus, the thermocouple element 120 is easily removable, and in the event of leakage of melt into the air space 68, it will freeze off around the thermocouple element 120 in the thermocouple tube 122 to prevent leakage into the rest of the system.

In use, the injection molding system is assembled as shown in FIG. 1. While only a single cavity 16 has been shown for ease of illustration, it will be appreciated that the melt distribution manifold 28 normally has many more melt passage branches extending to numerous cavities 16 depending on the application. Electrical power is applied to the heating element 36 in the manifold 28 and to the heating elements 54 in the nozzles 10 to heat them to a predetermined operating temperature. Heat from the heating element 54 in each nozzle 10 is conducted forwardly through the torpedo 46 to the nose portion 106 extending to the ring gate 14. Pressurized melt from a molding machine (not shown) is then injected into the melt passage 12 through the common inlet 40 according to a predetermined cycle in a conventional manner. The pressurized melt flows through the melt bore 42 of each nozzle, through the opening 44 between the spiral blades 84 of the torpedo 46, and through the fixed ring gate 14 to fill the cavity 16. The flow between the fixed spiral blades 88 imparts a swirling motion to the melt. This swirling motion is accelerated as the melt approaches the fixed ring gate 14 and results in the melt flowing outward in the cavity 16 near the ring gate 14 with a curving motion. This avoids unidirectional molecular orientation of the melt, at least adjacent the gate, and provides a stronger product in the gate area. After the cavities 16 are filled, injection pressure is held momentarily to pack and then released. After a short cooling period, the mold is opened to eject the molded products. After ejection, the mold is closed and injection pressure is reapplied to refill the cavities 16. This injection cycle is continuously repeated with a frequency dependent on the size and shape of the cavities 16 and the type of material being molded. During the injection cycle, there also is a continuous thermodynamic cycle in the torpedo 46. During injection, the torpedo 46 conducts excess heat which is generated by friction of the melt flowing through the constricted area of the ring gate 14 rearwardly to avoid stringing and drooling of the melt when the mold opens for ejection. After the melt has stopped flowing, solidification in the gate is enhanced by the removal of excess friction heat rearwardly through the torpedo 46. In some applications, the heating elements 54 are used to provide heat to control the operating temperature during the thermal cycle. In other applications, the transfer of heat produced in the melt by the screw barrel of the injection machine and by shear as it is forced through the torpedo 46 and the constricted gate 14 is sufficient to control the temperature of the melt in the gate 14 according to the thermodynamic cycle. Control of the melt viscosity during injection can also be provided by varying the velocity of melt flow or by changing the size of the ring gate 14 by exchanging the torpedo 46 for one having a different sized nose portion 106. The provision of heat to and removal of heat from the melt in the ring gate 14 during this heat transfer cycle is improved considerably by the nose portion 106 of the elongated central shaft 84 extending into the opening 78 to form the ring gate 14. This shape of the central shaft 84 with the nose portion 106 allows the thermally conductive inner portion 114 to extend closer to the gate which further improves heat transfer. The improved heat transfer provides faster solidification and reduces melt sticking to the molded product when the mold opens for ejection. Thus, cycle time is reduced and cosmetically cleaner gates are provided, particularly for larger diameter gates.

While the description of the injection molding apparatus according to the invention has been given with respect to a preferred embodiment, it will be evident that various other modifications are possible without departing from the scope of the invention as understood by those skilled in the art and as defined in the following claims.

The embodiments of the invention in which an exclusive property or privilege is claimed is defined as follows:

1. In an injection molding apparatus comprising a heated nozzle seated in a well in a mold and a torpedo to convey melt to an opening with an inner surface extending through the mold from the well to a cavity having a rear face, the nozzle having a rear end, a front end, a melt bore extending longitudinally therethrough from the rear end to the front end, and a seat extending around the melt bore at the front end of the nozzle, the torpedo having an outer collar, an elongated shaft extending centrally through the outer collar with an opening extending through the torpedo between the central shaft and the outer collar, and at least one support member extending across the opening between the central shaft and the outer collar, the outer collar being removably received in the seat at the front end of the nozzle with the opening through the torpedo aligned with the melt bore through the nozzle and the central shaft of the torpedo aligned with the opening through the mold to the cavity, the improvement wherein;

the central shaft of the torpedo has a forwardly projecting nose portion with an outer surface extending centrally into the opening through the mold, the nose portion of the elongated central shaft of the torpedo having a substantially flat front face substantially aligned with the rear face of the cavity, and the outer surface of the nose portion being sufficiently spaced from the inner surface of the opening through the mold to form a fixed ring gate through which the melt flows into the cavity.

2. Injection molding apparatus as claimed in claim 1 wherein the inner surface of the opening extending through the mold from the well to the cavity is substantially cylindrical.

3. Injection molding apparatus as claimed in claim 2 wherein the elongated central shaft of the torpedo tapers inwardly to the nose portion and the outer surface of the nose portion flares outwardly towards the front face.

4. Injection molding apparatus as claimed in claim 3 wherein the elongated central shaft of the torpedo has a highly heat conductive inner portion and a wear resistant outer portion.

5. Injection molding apparatus as claimed in claim 4 wherein the nozzle is seated in the well having an inner surface in the mold with an insulative air space extending between the outer surface of the nozzle and the inner surface of the well, the outer collar of the torpedo has a cylindrical rear portion and a cylindrical front portion, the cylindrical rear portion of the outer collar being removably received in the seat at the front end of the nozzle and the cylindrical front portion of the outer collar being received in a circular seat in the mold, whereby the outer collar bridges the insulative air space extending between the nozzle and the mold.

6. Injection molding apparatus as claimed in claim 5 wherein the rear portion of the outer collar of the torpedo has a threaded outer surface, the seat extending around the melt bore at the forward end of the nozzle has a matching threaded inner surface, and the outer collar of the torpedo has an engageable intermediate portion extending into the insulative air space between the front end of the nozzle and the mold to securely attach the torpedo to the nozzle by screwing the rear portion of the outer collar of the torpedo into the seat extending around the melt bore at the front end of the nozzle.

* * * * *